United States Patent
Price

(10) Patent No.: US 6,744,881 B1
(45) Date of Patent: Jun. 1, 2004

(54) SYSTEM AND METHOD FOR AUTOMATED CUSTOMER CALLING

(75) Inventor: Timothy M. Price, Rockville, MD (US)

(73) Assignee: Convergys Customer Management Group, Inc., Cincinnati, OH (US)

( * ) Notice: Subject to any disclaimer, the term of this patent is extended or adjusted under 35 U.S.C. 154(b) by 636 days.

(21) Appl. No.: 09/656,026

(22) Filed: Sep. 6, 2000

(51) Int. Cl.⁷ .............................. H04M 3/00; H04M 5/00
(52) U.S. Cl. ................ 379/308; 379/69; 379/265.01; 379/266.07
(58) Field of Search .................. 379/265.01–265.05, 379/265.09, 265.11, 266.01, 266.07, 266.09, 67.1, 68, 69, 79, 88.16, 308, 309

(56) References Cited

U.S. PATENT DOCUMENTS

| | | | |
|---|---|---|---|
| 5,309,505 A | * | 5/1994 | Szlam et al. ............. 379/88.01 |
| 5,430,792 A | | 7/1995 | Jesurum et al. |
| 5,442,693 A | * | 8/1995 | Hays et al. ................. 379/308 |
| 5,526,417 A | * | 6/1996 | Dezonno ................. 379/88.22 |
| 5,533,103 A | * | 7/1996 | Peavey et al. ................. 379/69 |
| 5,544,232 A | * | 8/1996 | Baker et al. ............. 379/88.25 |
| 5,590,171 A | * | 12/1996 | Howe et al. ................... 379/33 |
| 5,724,418 A | | 3/1998 | Brady |
| 5,724,420 A | | 3/1998 | Torgrim |
| 5,778,060 A | | 7/1998 | Otto |
| 5,799,066 A | | 8/1998 | Joyce et al. |
| 5,815,566 A | | 9/1998 | Ramot et al. |
| 5,828,731 A | * | 10/1998 | Szlam et al. ............. 379/88.16 |
| 5,933,492 A | | 8/1999 | Turovski |
| 5,937,057 A | | 8/1999 | Bell et al. |
| 5,970,132 A | | 10/1999 | Brady |
| 5,991,393 A | | 11/1999 | Kamen |
| 6,356,634 B1 | * | 3/2002 | Noble, Jr. .............. 379/266.07 |

\* cited by examiner

*Primary Examiner*—Roland Foster
(74) *Attorney, Agent, or Firm*—Frost Brown Todd LLC

(57) ABSTRACT

A system and method for providing an operator with automated calling functions allows the operator to be on the line when a customer call is placed so that a sales call can begin immediately if a customer answers the call. The system and method could be configured so that the operator can place calls automatically be selecting customers from customer call lists. The system and method may also allow the operator to cause a pre-recorded audio message to be played to a first customer, or the first customer's answering machine, while the operator proceeds to a second customer call placed over a second telephone line.

24 Claims, 5 Drawing Sheets

SYSTEM AND METHOD FOR AUTOMATED CUSTOMER CALLING

BACKGROUND OF THE INVENTION

1. Field of the Invention

The invention relates to automated calling systems used by sales personnel and other telephone operators to place a series of telephone calls to existing or potential customers.

2. Background of the Related Art

Various computer based automated calling systems have been created to partially automate the process of calling a plurality of customers. Typically, multiple operators will be connected to a central switching device. The central switching device will automatically place telephone calls to individual customers. If a customer, rather than an answering machine/service, actually answers a telephone call, the call is then connected with an operator's telephony device so that the operator can begin a sales call. If a customer's answering machine or answering service answers the automatically placed telephone call, the automated calling system will hang up. Alternatively, if an answering machine or answering service answers one of the automatically placed telephone calls, the calling system may wait for the greeting to end, then play a pre-recorded message to the customer's answering machine.

These types of automated calling systems include computer software which is designed to discriminate between calls answered by live customers, and calls answered by a customer's answering machine/service. If the automated calling service determines that a live person has answered a call, the telephone line must be switched to a free operator who then begins the customer sales call. There is inevitably a delay period between the time that the customer answers the telephone, and the time that an operator is able to pick up the line and begin the sales call. Customers who have become familiar with these calling systems will immediately hang up their telephone if they perceive that a delay is occurring while their telephone line is switched to a sales operator. This results in missed sales opportunities.

SUMMARY OF THE INVENTION

The invention is a system and method for providing automated calling services to a telephone operator. A calling system embodying the invention is configured to automatically place a telephone call to a customer in response to an operator's command. However, unlike prior art systems, with a system embodying the invention, the operator's telephony device is actually connected to the telephone line while the sales call is being automatically placed so that the operator can immediately begin the sales call if a live customer answers the telephone call. If a customer's answering service answers the telephone call, the operator can simply select the next customer on his call list, and the calling system will automatically place a telephone call to the second customer, and switch the operator's telephony device to the second call. This ensures that the operator is online and can begin a sales call with the second customer is a live customer answers the second call.

An automated calling system embodying the invention may also be configured to play a pre-recorded message over a telephone line connected to a customer, or a customer's answering machine/service. This could occur in at least two different situations.

In one situation, an operator could conduct a telephone call with a live customer, then inform the customer that he would like to have the customer listen to a prerecorded message. If the customer agrees, the operator can then move onto a new sales call with a second customer, and instruct the automated calling system to begin to play the pre-recorded message to the first customer. This requires that the calling system maintain the connection to the first customer's telephone line while it plays the pre-recorded message, and simultaneously connect the operator's telephony device to a second telephone line so that a second sales call can be placed to a second customer.

In a second scenario, if a first customer's answering machine answers a sales call, the operator can instruct the automated calling system to play a pre-recorded message to the first customer's answering machine while the operator moves on to a second customer. This would cause the automated calling system to connect the operator's telephony device to a second telephone line and to automatically place a telephone call to the second customer using the second telephone line. The calling system would also simultaneously monitor the first customer's telephone line to determine when the first customer's answering machine message ends. Once the answering machine has completed its message, the system would play a pre-recorded message to the first customer's answering machine over the first telephone line, and then terminate the call.

A system and method embodying the present invention allows for telephone calls to be automatically placed using a customer calling list. In addition, because the operator is on the line as each call is being placed, customers are less likely to hang up. An automated calling system embodying the invention also provides the ability to play pre-recorded messages to live customers, or customer answering machines, while the operator moves on to a new telephone call. This increases the efficiency of the operator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in conjunction with the following drawing figures, wherein like reference numerals refer to like elements, and wherein.

DETAILED DESCRIPTION OF PREFERRED EMBODIMENTS

Figure 1:
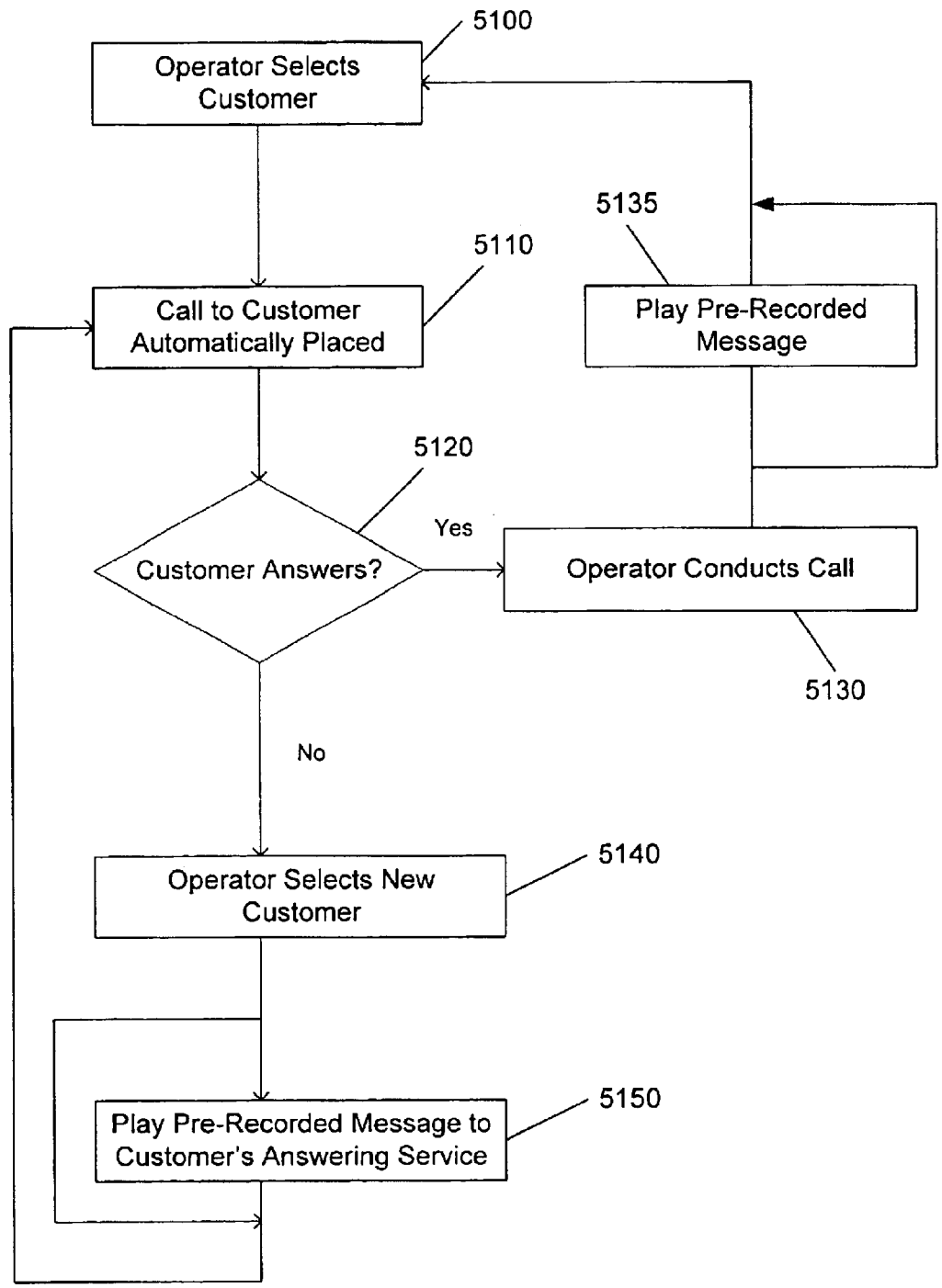
FIG. 1 is a flow chart illustrating steps of a method embodying the invention.

A method embodying the invention is illustrated in FIG. 1. In the method, an operator would first select a customer to be called in step S100. In preferred embodiments of the invention, an operator would create an electronic customer call list that would be stored in a computer memory. The step of selecting a customer could comprise selecting a customer from a previously created customer call list using a computer pointing device.

The selected customer's telephone number would automatically be called using a first telephone line in step S110. An operator's telephony device would be connected to the first telephone line so that the operator could immediately begin a sales call with the customer if a live customer answers the telephone call. The operator would determine, in step S120, if a live customer has answered the call, or if a customer's answering machine or answering service has answered the call.

If a live customer answers the call, in step S130, the operator would actually conduct a sales call with the customer. After the call has been completed, the operator could instruct the calling system to play a pre-recorded message to the customer in step S135. Alternatively, the operator could simply select a new customer in step S100, and the method would be repeated. If the operator instructs the system to play a pre-recorded message to the customer in step S135, the message would be played using the telephone line connected to the first customer, but the operator would then proceed to select a new customer, in step S100, while the pre-recorded message is being played. The system would automatically place a new call to a newly selected customer using a new telephone line, and the telephony device would be connected to the new telephone line. This allows the operator to begin a new sales call with a new customer while the pre-recorded message is still being played to the first customer.

If, in step S120, the operator determines that a customer's answering machine or answering service has answered the call, the operator would immediately select a new customer in step S140. This could cause the system to immediately place a new telephone call to the new customer in step S110. The operator's telephony device would be connected to the new call so that the operator could immediately begin a sales call with the new customer.

Alternatively, if the operator so desires, a pre-recorded audio message could be played to the first customer's answering machine/service in step S150. This would occur using the first telephone line. At the same time that the pre-recorded audio message is played to the first customer's answering machine over the first telephone line, a telephone call Would be automatically placed to the new selected customer using a second telephone line in step S110. This would allow the operator to conduct a call with the second customer using the second telephone line, at the same time that the pre-recorded audio message is played to the First customer's answering machine over the first telephone line.

Figure 2:
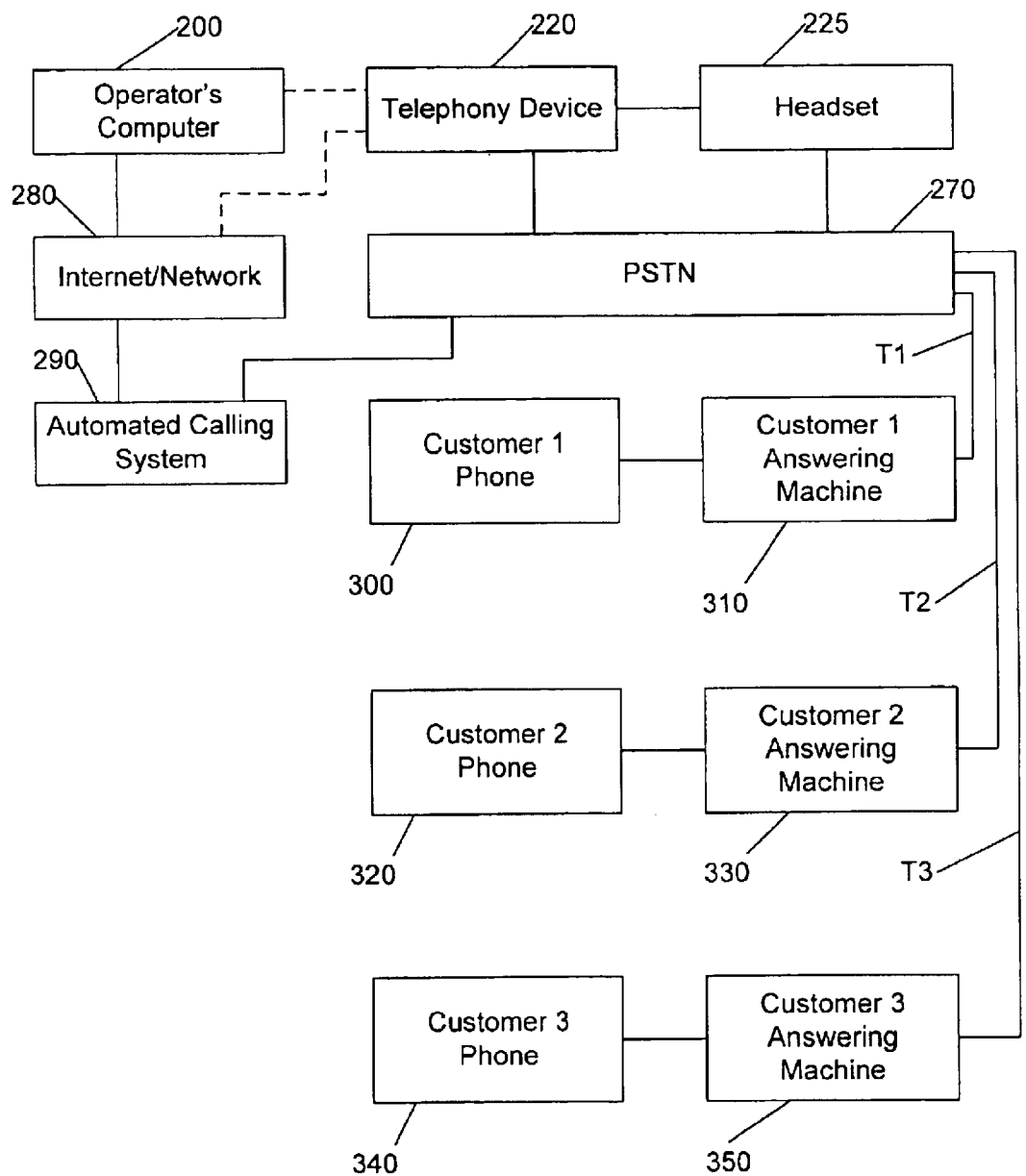
FIG. 2 is a block diagram illustrating elements of an automated calling system embodying the invention connected to an operator's station, and a plurality of customers.

FIG. 2 provides a block diagram illustrating how an automated calling system embodying the invention could be connected to various other elements to provide an operator with automated calling functions. As shown in FIG. 2, the automated calling system 290 could be connected to the Internet or any other type of computer network 280. The automated calling system would also be connected to a publically switched telephone network (PSTN) 270. The automated calling system 290 would be capable of connecting to multiple telephone lines through the PSTN 270.

An operator's station would include an operator's computer 200 and a telephony device 220. The operator's computer 200 would be connected to the Internet/network 280, so that communications could be exchanged between the operator's computer 200 and the automated calling system 290. In preferred embodiments of the invention, the automated calling system 290 could include or be connected to an Internet server, which would provide a means for the operator to communicate with the automated calling system 290. In this instance, an Internet browser program could be resident on the operator's computer 200. The Internet browser program would then be used to facilitate communications between the automated calling system 290 and the operator via the Internet/network 280. In other embodiments of the invention, specialized software resident on the operator's computer 200 could be used to communicate with an to control the automated calling system 290 via the Internet or computer network 280.

The operator's telephony device 220 could be connected to the PSTN 270. The operator's telephony device could comprise a standard landline telephone, a wireless telephone, or any type of device that would allow the operator to conduct communications over a PSTN 270. A headset 225 could also be connected to the telephony device 220, or the PSTN 270, to provide the operator with hands-free operations.

In other embodiments of the invention, the operator's telephony device 220 could communicate with the automated calling system 290 via the Internet/network 280. This could involve exchanging packetized digital data between the operator's telephony device 220 and the automated calling system 290. In this instance, the operator's telephony device could be directly coupled to the Internet/network 280, or the operator's computer 200 could be used as an interface, as reflected by the dashed lines in FIG. 2.

Regardless of how the operator's computer 200 communicates with the automated calling system 290, the operator would use the computer 200 to send commands to the automated calling system 290. The commands would be used to cause the automated calling system 290 to place telephone calls to selected customers, and to cause the automated calling system to play pre-recorded audio messages to a customer or a customer's answering machine.

As also shown in FIG. 2, a plurality of customer answering machines 310, 330, 350 and corresponding customer telephones 300, 320, 340 could be connected to the PSTN 270. Although FIG. 2 depicts the customer telephones connected to the PSTN 270 via answering machines, a customer telephone could be directly connected to the PSTN 270. Also, many telephone companies now provide an answering service which does not require the use of a separate answering machine. In this instance, the customer telephones would be directly connected to the PSTN 270, and automated systems resident at the telephone company would provide the answering service.

An operator could access the automated calling system 290 using the operator's computer 200 to create or edit customer calling lists. Thus, customer calling lists could be stored, in an electronic form, on the automated calling system 290. In alternative embodiments, a particular operator's customer calling lists could be stored in an electronic form on the operator's computer 200. Each calling list would include the telephone numbers and possibly the names of a plurality of customers. The customer calling lists could be arranged according to geographic locations, or according to some other common customer characteristics.

When the operator wishes to use the automated calling system 290 for automated calling services, the operator would first use the operator's computer 200 to access the automated calling system 290. The operator would instruct the automated calling system 290 to connect to the operator's telephony device 220. This Could be done by calling the operator's telephony device 220 through the PSTN 270, or by establishing a link to the operator's telephony device 220 via the Internet/network 280. In any event, this would establish a link between the operator's telephony device 220 and the automated calling system 290.

The operator could use the automated calling system to record an audio message which can be played to customers or customer answering machines. Alternatively, the operator could simply access a customer call list and begin making customer calls.

Once the link is established between the automated calling system 290 and the operator's telephony device 220, an interactive voice response system could be used by the automated calling system 290 to communicate with the operator. Alternatively, the operator could continue to instruct the automated calling system via commands entered through the operator's computer 200.

To place a telephone call to a particular customer, the operator could first access a customer call list. This could be done by retrieving a file that is displayed on a screen of the operator's computer 200. The operator could then select a first customer from the call list. This could be done by using a selecting device, such as a mouse, that is part of the operator's computer 200. The automated calling system 290 would then automatically place a telephone call to the selected customer using a first telephone line T1. The automated calling system 290 would then connect the operator's telephony device 220 to the first telephone line T1 so that the operator can immediately communicate with the customer if a live customer actually picks up and answers the telephone call with customer No. 1's telephone 300.

Assuming a live person answers the first call, the operator would conduct a sales call. Once the sales call has been completed, the operator could execute a command instructing the automated calling system 290 to disconnect the telephone call. Alternatively, the operator could ask the customer if he would like to listen to a pre-recorded audio message. If the customer agrees, the operator could use the operator's computer 200 to instruct the automated calling system 290 to play a pre-recorded audio message to customer No. 1's telephone 300 via telephone line T1. At the same time the audio message is being played to customer No. 1's telephone 300 via the first telephone line T1, the operator could instruct the automated calling system 290 to place a second telephone call to customer No. 2's telephone 320 using a second telephone line T2. The automated calling system 290 would place the telephone call to customer No. 2, and then connect the operator's telephony device 200 to the second telephone line T2 so that the operator can immediately begin to communicate with customer No. 2 if that customer answers the new call.

If, instead of a live customer, customer No. 2's answering machine 330 answers the second telephone call, the operator could sue the operator's computer 200 to instruct the automated calling system 290 to play a pre-recorded audio message to customer No. 2's answering machine 330, while at the same time placing a new telephone call to a third customer using a third telephone line T3. This would allow a pre-recorded audio message to be played to customer No. 2's answering machine 330 at the same time the operator's telephony device 220 is connected to a third customer's telephone 340 via a third telephone line T3.

The automated calling system 290 is designed so that it can maintain links to multiple customer telephones or answering machines at the same time. Because the operator's telephony device 220 is also connected to the automated calling system 290, the operator's telephony device 220 can be switched between any of the calls placed to customer telephones. This means that it is possible for the automated calling system 290 to be playing multiple pre-recorded messages to multiple live customers or customer answering machines while the operator moves on to new sales calls. This maximizes the operator's efficiency. At the same time, the automated calling system 290 can ensure that the operator is actually connected to the customer's line each time a new call is placed. This means that there will be no delay period between the time that a customer answers a call, and the time that the operator can begin the sales call.

In preferred embodiments of the invention, a display screen of the operator's computer 200 would display a customer call list while the operator is conducting his sales calls. A pointing device of the operator's computer 200 would be used by the operator to select customers, and to instruct the automated calling system 290 to perform various functions. For instance, selecting an entry of a customer call list could cause the system to automatically place a call to that customer, and to connect the operator's telephony device to the customer's line. When the operator has completed a sales call, selecting a new entry on the customer call list could cause the calling system to automatically terminate the first call, automatically call the new selected customer and automatically connect the operator's telephony device 220 to the new call.

If a customer's answering machine picks up a call, selecting a new entry on the customer call list could also cause the calling system 290 to automatically place a new call to the newly selected customer, to switch the operator's telephony device 220 to the new call, while at the same time maintaining the link to the first customer's answering machine. Once the answering machine completes its message, the calling system 290 could play a pre-recorded message to the first customer's answering machine before disconnecting from the first customer's telephone line.

As mentioned above, the automated calling system 290 could include an Internet server. In this instance, an operator's computer could access the automated calling system using an Internet browser. The automated calling system could also include a telephony switching device for switching an operator's telephony device 220 between a plurality of different telephone lines connected to the PSTN 270.

In alternative embodiments, software for implementing the automated calling system 290 could be fully or partially resident on the operator's computer 200. This software would allow the operator to perform various automated calling functions by executing commands using the operator's computer. The software resident on the operator's computer would then communicate with other elements of the automated calling system via a computer network or the Internet. The elements of the automated calling system separate from the operator's computer could include a telephony switching device that is connected to the PSTN 270.

Figure 3:
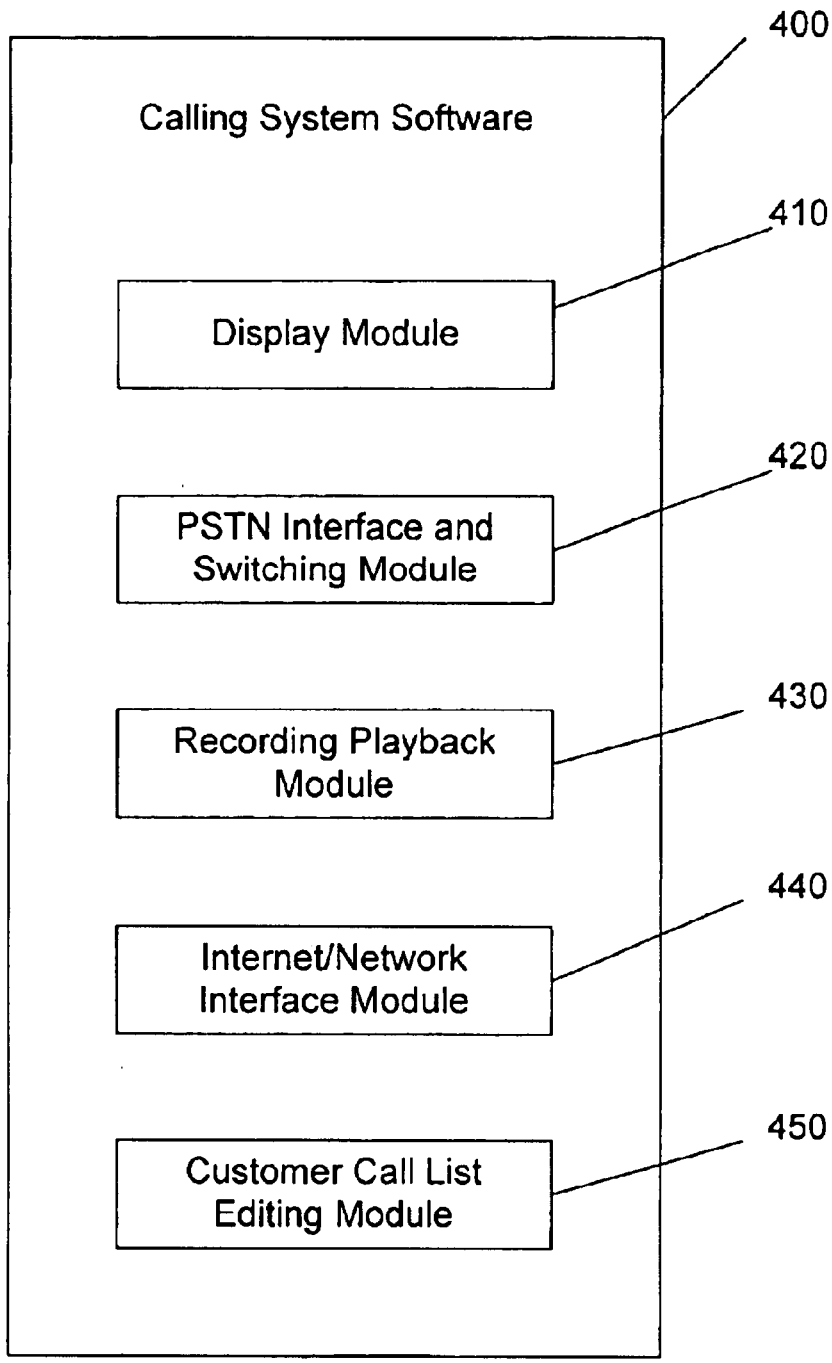
FIG. 3 is a block diagram illustrating elements of a software program embodying the invention.

Regardless of where the software is resident, automated calling system software embodying the invention would include various submodules. As shown in FIG. 3, calling system software 400 embodying the invention could include a display module 410, a PSTN interface and switching module 420, a recording and playback module 430, an Internet/network interface module 440, and a customer call list editing module 450.

The display module 410 would be used to display a customer call list to an operator. The display module could also provide an operator with the ability to select customers from a displayed customer call list to instruct the calling system to place automated telephone calls to selected customers. The display module could also be used to display command menus that can be used to instruct the automated calling system 290 to take certain actions.

The PSTN interface and switching module 420 would be used to place telephone calls to selected customers, and to control the devices to which a particular telephone line is connected. For instance, when a telephone call is first placed to a customer, the PSTN interface and switching module 420 would ensure that the operator's telephony device 220 is connected to the telephone line. This ensures that the operator can immediately begin to conduct a call with the customer should a live customer answer. Alternatively, if a customer's answering machine were to answer a call, the PSTN interface and switching module 420 could be used to switch the telephone line over to an audio playing device so that a pre-recorded audio message could be played to a customer's answering device. The PSTN interface and switching module 420 could also be used to switch the operator's telephony device 220 over to a new telephone line, and to place an automated call to a second customer on the new telephone line.

The recording and playback module 430 would be used to record an audio message which is to be played to customers or customer answering machines. The recording and playback module 430 would allow the operator to speak his audio message into the operator's telephony device 220, and the message would be recorded on a recording device. The recording device could include any type of audio recording device including magnetic or optical tapes or disk drives. The recording and playback module 430 could be configured to convert an audio message into a digital format which is then stored on a computer data storage device. The recording and playback module 430 could also be configured to access digital data files containing an audio message, and to play these audio messages to a customer or a customer's answering machine over a telephone line.

The Internet/network interface module 440 would be used to effect communications between an operator's computer 200 and other portions of the automated calling system. As explained above, an operator's computer 200 could be coupled to other elements of the automated calling system via a computer network, or over the Internet. If the Internet is used for communications, the Internet/network interface module 440 could include the software necessary for an Internet browser on the operator's computer 200 to interact with the automated calling system.

The customer call list editing module 450 would be used to create lists of customers and associated customer telephone numbers, and to edit those lists. As mentioned above, the customer calling lists could be resident on the automated calling system itself, or such lists could be stored on operator computers.

Figure 4:
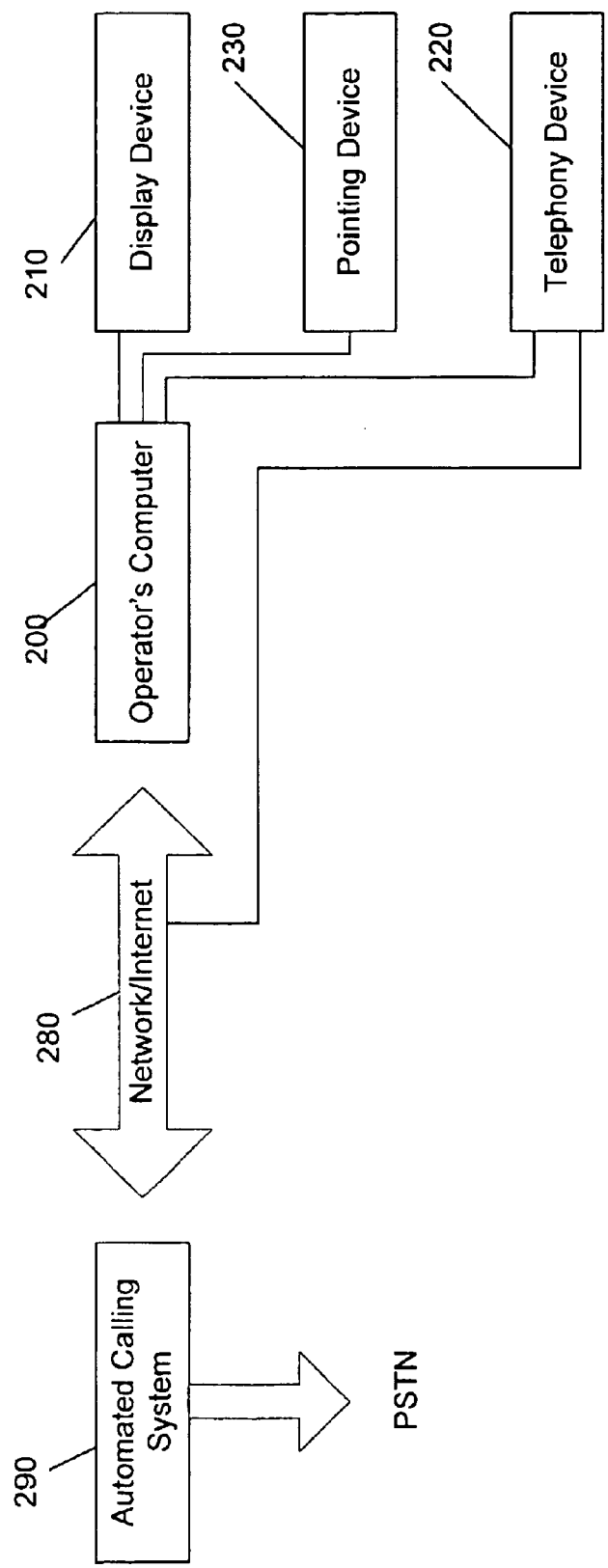
FIG. 4 is a block diagram illustrating an automated calling system embodying the invention connected to an operator's station.

As mentioned above, in some embodiments of the invention, the operator's telephony device 220 could be connected to an automated calling system 290 via a network or the Internet 280, as shown in FIG. 4. In this instance, it would not be necessary for the automated calling system 290 to communicate with an operator's telephony device 220 over a PSTN. Instead, the operator's telephony device 220, along with the operator's computer 200, would be connected to the automated calling system 290 via a network or Internet interface. As data transfer rates over the Internet increase, the inventors expect an embodiment as shown in FIG. 4 to become more viable.

In an embodiment of the invention as depicted in FIG. 4, the automated calling system 290 would communicate with customer telephones or answering machines/services over a PSTN in the same way as the embodiments as described above. However, the automated calling system 290 would switch the operator's telephony device 220 to different telephone lines of the PSTN via a network/Internet interface 280. This could involve sending digital data over the network/Internet connection in a form similar to the way digital wireless telephones communicate voice information. In this instance, the operator's telephony device 220 could be connected to the operator's computer 200, and the operator's computer 200 and associated software could provide an interface between the automated calling system 290 and the operator's telephony device 220.

Also, in this embodiment, the operator's telephony device 220 could take the form of a microphone and speakers connected to the operator's computer 200. In this instance, the telephony device 220 could simply be interfaced to the operator's computer 200, and the automated calling system 290 would then communicate with the operator's computer 200 via the network/Internet 280. This would eliminate the need for a separate connection between the network/Internet 280 and the telephony device 220.

Figure 5:
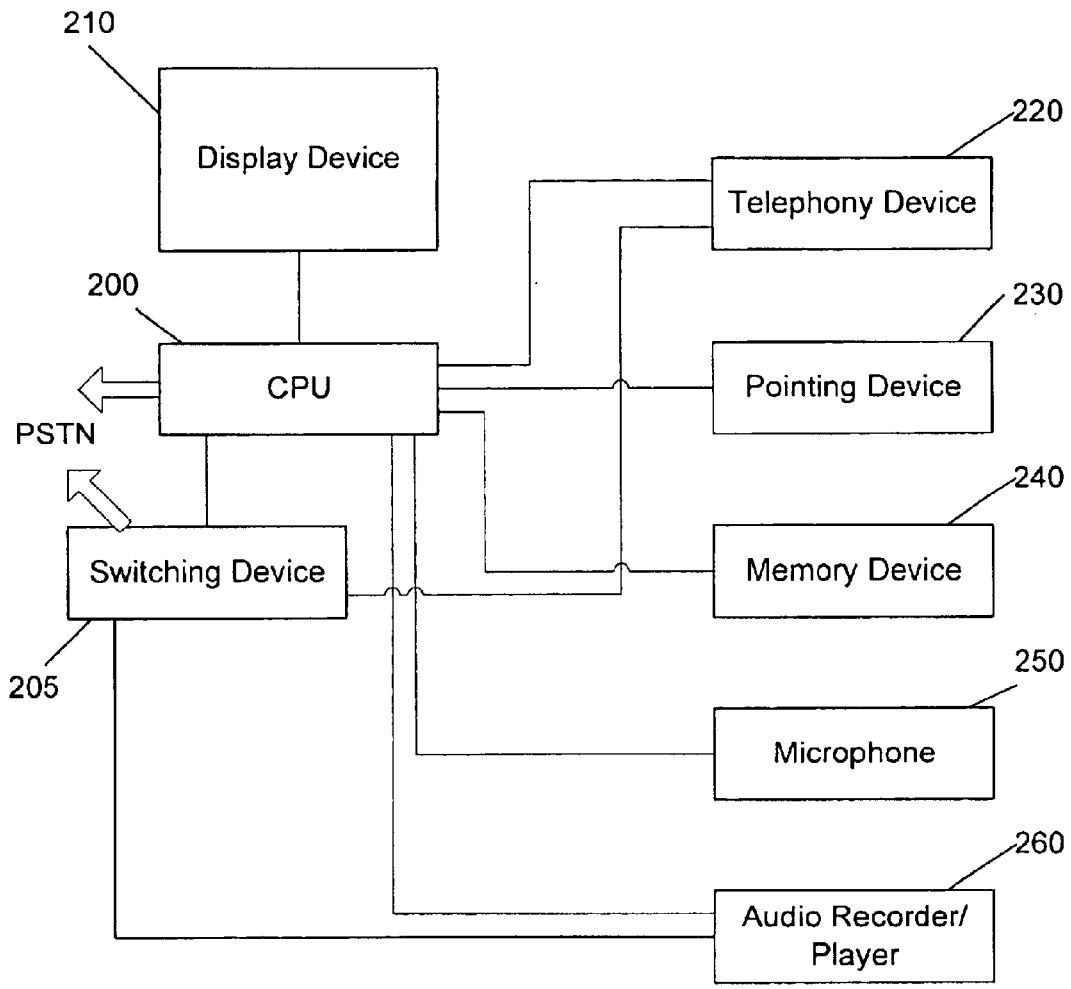
FIG. 5 is a block diagram illustrating another automated calling system embodying the invention.

In yet another embodiment of the invention, as shown in FIG. 5, the automated calling system software could be completely resident on an operator's computer 200. This would eliminate the need for a separate automated calling system which is accessed by the operator's computer via a network or the Internet.

As shown in FIG. 5, in this embodiment, an operator's computer 200 could be directly coupled to a PSTN. Alternatively, the operator's computer 200 could be coupled to a switching device 205, and the switching device could be coupled to the PSTN. A display device 210 would be connected to the computer 200. The display device would be used to display customer calling lists, and an operator could select particular customers using a pointing device 230.

A telephony device 220, which could be in the form of a headset or telephone, could be connected to the operator's computer 200. Alternatively, the telephony device 220 could take the form of a microphone and one or more speakers that are connected to the operator's computer 200. The operator's computer 200 would utilize the calling system software to selectively connect the telephony device 220 to telephone lines of the PSTN This embodiment of the invention could also include a microphone 250 and an audio recorder/player 260 which are also coupled to the computer 200. This would allow the operator to record audio messages which are to be played to customers or a customer's answering service. The microphone 250 could be the same microphone which forms part of the telephony device 220. Thus, the operator could use the telephony device 220 to record audio messages that are to played to customers.

In an embodiment as shown in FIG. 5, the operator would instruct the computer 200 to place a telephone call to a customer via the PSTN. The computer 200 would place the telephone call and then connect the telephony device 220 to the line of the PSTN used to call the customer. All the various operations of the automated calling system would then be similar to those described above.

An embodiment as shown in FIG. 5 could require a special switching device to be resident within the operator's computer 200. Alternatively, a separate switching unit 205 capable of switching the telephony device 220 and the audio recorder/player 260 to various telephone lines of the PSTN could be provided. An embodiment as shown in FIG. 5 could provide a lower cost means for providing an operator with the automated calling functions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An automated calling system, for allowing an operator to place a series of telephone calls to a plurality of customers, wherein the operator uses a telephony device to communicate with customers, the calling system comprising:

a switching device connected to a public switched telephone network, wherein the switching device is configured to selectively connect the operator's telephony device to one of a plurality of telephone lines; and a processor coupled to and controlling the switching device, wherein the processor is configured to automatically place a first telephone call to a first customer using a first telephone line, and to cause the switching device to connect the operator's telephony device to the first telephone line as the first telephone call is being placed, in response to an operator's command selecting the first customer, wherein the processor is configured to automatically place a second telephone call to a second customer using a second telephone line, and to cause the switching device to connect the operator's telephony device to the second telephone line as the second telephone call is being placed, in response to an operator's command selecting the second customer, and wherein the operator can listen as the calls are placed so that the operator can immediately talk to a customer if the customer answers a call.

2. The system of claim 1, further comprising an audio device configured to record and play audio recordings, wherein the processor is configured to cause the switching device to connect the audio device to a telephone line and to cause the audio device to play a pre-recorded audio message over the telephone line.

3. The system of claim 2, wherein the operator can record an audio message on the audio device using the operator's telephony device.

4. The system of claim 2, wherein the processor is configured so that, in response to an operator command, the processor will cause the audio device to play a pre-recorded audio message over a first telephone line at the same time that a telephone call is placed to a customer over a second telephone line such that the operator can speak with the customer over the second telephone line at the same time the pre-recorded audio message is played over the first telephone line.

5. The system of claim 2, wherein the processor and audio device are configured so that if the operator commands a pre-recorded audio message to be played over a telephone line to a customer's answering service, the pre-recorded audio message is not played until a greeting generated by the customer's answering service has ended.

6. The system of claim 1, wherein the processor is configured to place a telephone call to the operator's telephony device over the public switched telephone network, and wherein the switching device is configured to connect to the operator's telephony device to selected ones of the plurality of telephone lines using the public switched telephone network.

7. The system of claim 1, wherein the switching device and the operator's telephony device are connected to a network, and wherein the switching device is configured to connect the operator's telephony device to selected ones of the plurality of telephone lines via the network.

8. The system of claim 1, wherein the processor is connected to a network, and wherein the operator commands are relayed to the processor over the network.

9. The system of claim 8, wherein the processor is configured to receive operator commands in the form of electronic signals issued by an operator's computer.

10. A method for allowing an operator to conduct a series of customer telephone calls using a calling system, wherein the operator communicates with customers using an operator telephony device that is selectively connected to a plurality of telephone lines of a public switched telephone network, the method comprising:

automatically placing a first telephone call to a first customer over a first telephone line, and connecting the operator's telephony device to the first telephone line as the first telephone call is being placed so that the operator can immediately talk to the first customer if the first customer answers, in response to an operator command selecting the first customer;

automatically placing a second telephone call to a second customer over a second telephone line, and connecting the operator's telephony device to the second telephone line as the second telephone call is being placed so that the operator can immediately talk to the second customer if the second customer answers, in response to an operator command selecting the second customer; and playing a pre-recorded audio message over the first telephone line at the same time the second telephone call is placed so that the pre-recorded audio message is played over the first telephone line at the same time the operator is talking with the second customer over the second telephone line.

11. The method of claim 10, further comprising the step of recording an audio message using the operator's telephony device.

12. The method of claim 10, wherein the operator commands are executed by having the operator use a pointing device connected to an operator's computer.

13. The method of claim 12, wherein an operator's command selecting a customer comprises selecting the customer from a customer list displayed on the operator's computer using the pointing device connected to the computer.

14. The method of claim 10, wherein the step of playing a pre-recorded audio message over the first telephone line comprises playing the pre-recorded audio message to a customer's answering service.

15. The method of claim 14, wherein the pre-recorded message is played to the customer's answering service only after a greeting generated by the customer's answering service has ended.

16. The method of claim 10, wherein the step of connecting the operator's telephony device to the first telephone line comprises placing a telephone call to the operator telephony device over a public switched telephone network.

17. The method of claim 10, wherein the operator's telephony device is connected to a network, and wherein the step of connecting the operator's telephony device to a first telephone line comprises connecting the telephony device to the first telephone line via the network.

18. A computer readable medium storing a set of instructions for a computer based calling system connected to multiple telephone lines of a public switched telephone network, the instructions configuring the calling system to provide an operator having a telephony device with automated calling functions, wherein the instructions configure the calling system to execute a series of steps, comprising:

automatically calling a first customer on a first telephone line, and connecting the operator's telephony device to the first telephone line as the first telephone call is being placed so that the operator can immediately talk to the first customer if the first customer answers the telephone call, in response to an operator command selecting the first customer;

automatically calling a second customer on a second telephone line, and connecting the operator's telephony device to the second telephone line as the second telephone call is being placed so that the operator can immediately talk to the second customer if the second customer answers the telephone call, in response to an operator command selecting the second customer; and playing a pre-recorded audio message over the first telephone line at the same time the second telephone call is placed so that the operator can talk to the second customer over the second telephone line at the same time the audio message is played on the first telephone line.

19. The computer readable medium of claim 18, wherein the instructions also configure the calling system to allow the operator to record an audio message that will be played over a telephone line.

20. The computer readable medium of claim 18, wherein the instructions also configure the calling system to play the pre-recorded audio message over the first telephone line to a customer's answering service, in response to an operator's command, and wherein the calling system will wait for a greeting generated by the customer's answering system to end before playing the audio message.

21. The computer readable medium of claim 18, wherein the instructions also configure the calling system to receive operator instructions in the form of electronic signals received over a network.

22. The computer readable medium of claim 18, wherein the instructions configure the calling system to place a telephone call to the operator's telephony device over the public switched telephone network, and wherein the instructions configure the calling system to connect the operator's telephony device to selected ones of the plurality of telephone lines via the public switched telephone network.

23. The computer readable medium of claim 18, wherein the instructions configure the calling system to communicate with the operator's telephony device over a network, and wherein the instructions configure the calling system to connect the operator's telephony device to selected ones of the plurality of telephone lines via the network.

24. The computer readable medium of claim 23, wherein the network comprises the Internet.

* * * * *

UNITED STATES PATENT AND TRADEMARK OFFICE
CERTIFICATE OF CORRECTION

PATENT NO. : 6,744,881 B1
DATED : June 1, 2004
INVENTOR(S) : Price

It is certified that error appears in the above-identified patent and that said Letters Patent is hereby corrected as shown below:

Column 10,
Line 64, should read -- the operator's telephony --.

Signed and Sealed this

Twenty-second Day of March, 2005

JON W. DUDAS
*Director of the United States Patent and Trademark Office*